United States Patent
Oki

(10) Patent No.: US 10,436,902 B2
(45) Date of Patent: Oct. 8, 2019

(54) RANGE FINDING DEVICE AND RANGE FINDING METHOD

(71) Applicant: NISSAN MOTOR CO., LTD., Kanagawa (JP)

(72) Inventor: Takahiko Oki, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1450 days.

(21) Appl. No.: 14/379,937

(22) PCT Filed: Feb. 26, 2013

(86) PCT No.: PCT/JP2013/054948
§ 371 (c)(1),
(2) Date: Aug. 20, 2014

(87) PCT Pub. No.: WO2013/129387
PCT Pub. Date: Sep. 6, 2013

(65) Prior Publication Data
US 2015/0012244 A1    Jan. 8, 2015

(30) Foreign Application Priority Data

Mar. 1, 2012    (JP) .................................. 2012-045238

(51) Int. Cl.
*G01S 17/08*    (2006.01)
*G01S 17/32*    (2006.01)
(Continued)

(52) U.S. Cl.
CPC ................ *G01S 17/08* (2013.01); *G01C 3/08* (2013.01); *G01S 7/4918* (2013.01); *G01S 17/32* (2013.01); *G01S 17/48* (2013.01); *G01S 17/936* (2013.01)

(58) Field of Classification Search
CPC .......... G06T 7/0042; G01V 1/28; G09G 3/20; F16G 13/06; G01S 17/32; G01S 17/08;
(Continued)

(56) References Cited

U.S. PATENT DOCUMENTS 528,622 A  *  11/1894  Ueno ..................... F16G 13/06
                                                       474/228
7,508,457 B2 *   3/2009  Yamagishi ............... G09G 3/20
                                                       348/672
(Continued)

FOREIGN PATENT DOCUMENTS

CN   101363729 A   2/2009
JP   04-166788 A   6/1992
(Continued)

*Primary Examiner* — Andrew Schechter
*Assistant Examiner* — Kaleria Knox
(74) *Attorney, Agent, or Firm* — Young Basile Hanlon & MacFarlane, P.C.

(57) ABSTRACT

A range finding device includes: a light projecting unit having an irradiation domain extending in a horizontal direction, and configured to project intensity-modulated irradiation light; an image capturing unit configured to capture an image of an object irradiated with the irradiation light; a light projection controller configured to control an intensity of the irradiation light in accordance with a timing at which the image capturing unit captures the image; a synchronous detection unit configured to extract a synchronous detection region, in which brightness changes in synchronism with intensity modulation of the irradiation light, from the image captured by the image capturing unit; an edge detector configured to detect an edge of the synchronous detection region; and a range calculator configured to calculate a distance to the object on the basis of the edge of the synchronous detection region detected by the edge detector.

11 Claims, 9 Drawing Sheets

(51) Int. Cl.
  *G01S 17/48* (2006.01)
  *G01S 17/93* (2006.01)
  *G01C 3/08* (2006.01)
  *G01S 7/491* (2006.01)

(58) Field of Classification Search
  CPC ..... G01S 7/4918; G01S 17/936; H04N 7/183;
  G01C 3/08
  USPC ............ 702/16; 348/672; 382/103; 474/228;
  250/205
  See application file for complete search history.

(56) References Cited

U.S. PATENT DOCUMENTS

| | | | |
|---|---|---|---|
| 7,812,931 | B2 | 10/2010 | Nishiuchi |
| 8,594,390 | B2 * | 11/2013 | Yoshizumi ............ G06T 7/0042 382/103 |
| 2004/0044479 | A1 * | 3/2004 | Sansone .................. G01V 1/28 702/16 |
| 2008/0237445 | A1 * | 10/2008 | Ikeno ...................... G01S 17/32 250/205 |
| 2009/0040500 | A1 | 2/2009 | Nishiushi |

FOREIGN PATENT DOCUMENTS

| | | |
|---|---|---|
| JP | 06-042960 A | 2/1994 |
| JP | 2008-051759 A | 3/2008 |
| JP | 2009-186258 A | 8/2009 |
| JP | 2010-107448 A | 5/2010 |

\* cited by examiner

RANGE FINDING DEVICE AND RANGE FINDING METHOD

CROSS REFERENCE TO RELATED APPLICATION

The present application claims priority to Japanese Patent Application No. 2012-045238, filed Mar. 1, 2012 and incorporated herein in its entirety.

TECHNICAL FIELD

The present invention relates to a range finding device for, and a range finding method of, measuring a distance to an object by irradiating the object with intensity-modulated irradiation light.

BACKGROUND

Among known optical range finding devices, there is one which is configured to: irradiate an object with irradiation light; capture reflected light reflected off the object with an image capturing device such as a CCD; and measure a distance to the object or a shape of the object on the basis of the acquired image data. If the irradiation light reflected off the object is weaker than background light, the range finding device of this kind may be unable to recognize the object correctly because the reflected light may be buried in the background light (noise).

With this taken into consideration, a proposal has been heretofore made on a range finding device in which a light transceiver unit for a long range where the reflected light is weak, and a light transceiver unit for a short range where the reflected light is sufficiently strong are capable of measuring a distance to a remote object and a distance to a near object independently by using irradiation light different in wavelength and blinking cycle (see Japanese Patent Application Publication No. 2010-107448, for example).

SUMMARY

Let us assume a case where a distance is measured by using a transmitted signal whose intensity is modulated with a sine wave or the like for the purpose of enhancing robustness against noise. If a quantity of background light is located near an upper end portion or a lower end portion in a linear observation region in a brightness sensitivity characteristic of an image capturing device, reflected light representing the transmitted signal superposed on the background light is observed in a non-linear region in the brightness sensitivity characteristic of the image capturing device in some cases.

In this case, the upper end portion (an upper peak area of the sine wave) or the lower end portion (a lower peak of the sine wave) of the intensity-modulated signal acquired from an image captured by an image capturing unit becomes saturated, and an error accordingly occurs in synchronous detection judgment in a synchronous detection process performed on the transmitted signal. This causes a problem that despite ample information on the reflection, the intensity-modulated signal fails to be detected, and this lowers the accuracy in measuring the distance to the object and the shape of the object.

The present invention has been made to solve the above-mentioned problem. An objective of the present invention is to provide a range finding device and a range finding method capable of measuring the distance to an object or the shape of the object with high accuracy even if the intensity-modulated signal acquired from the captured image is detected in the non-linear region in the brightness sensitivity characteristic of the image capturing unit.

To attain the above objective, a range finding device according to a first aspect of the present invention includes: a light projecting unit mounted on a moving body, having an irradiation domain extending in a horizontal direction, and configured to project intensity-modulated irradiation light; an image capturing unit mounted on the moving body, and configured to capture an image of an object irradiated with the irradiation light; a light projection controller configured to control an intensity of the irradiation light in accordance with a timing at which the image capturing unit captures the image; a synchronous detection unit configured to extract a region in which brightness changes in synchronism with intensity modulation of the irradiation light, as a synchronous detection region, from the image captured by the image capturing unit; an edge detector configured to detect an edge of the synchronous detection region; and a range calculator configured to calculate a distance to the object on the basis of the edge of the synchronous detection region detected by the edge detector. If the change in the brightness of the image captured by the image capturing unit brings about a brightness output value in a non-linear region of the image capturing unit, the synchronous detection unit calculates an amplitude and a direct current component of the irradiation light which are needed to shift the change in the brightness of the image to a linear region of the image capturing unit. The light projection controller controls the intensity of the irradiation light on the basis of the calculated amplitude and direct current component of the irradiation light.

A range finding device according to a second aspect of the present invention includes: a light projecting unit mounted on a moving body, having an irradiation domain extending in a horizontal direction, and configured to project intensity-modulated irradiation light; an image capturing unit mounted on the moving body, and configured to capture an image of an object irradiated with the irradiation light; a light projection controller configured to control an intensity of the irradiation light in accordance with a timing at which the image capturing unit captures the image; a synchronous detection unit configured to extract a region in which brightness changes in synchronism with the modulation of the intensity of the irradiation light, as a synchronous detection region, from the image captured by the image capturing unit; and a range calculator configured to calculate a distance to the object on the basis of the synchronous detection region.

A range finding method according to a third aspect of the present invention includes: irradiating an object with intensity-modulated irradiation light by use of a light projecting unit mounted on a moving body; capturing an image of the object irradiated with the irradiation light by use of an image capturing unit mounted on the moving body; controlling an intensity of the irradiation light in accordance with a timing at which the image is captured; extracting a region in which brightness changes in synchronism with intensity modulation of the irradiation light, as a synchronous detection region, from the captured image; detecting an edge of the synchronous detection region; calculating a distance to the object on the basis of the detected edge; calculating an amplitude and a direct current component of the irradiation light which are needed to shift the change in the brightness of the image to a linear region of the image capturing unit if the change in the brightness of the captured image brings about a brightness output value in a non-linear region of the image capturing unit; and controlling the intensity of the irradiation light on the basis of the calculated amplitude and direct current component of the irradiation light.

BRIEF DESCRIPTION OF DRAWINGS

FIG. 4 is a timing chart showing how signals shown in FIG. 3 change, in which FIG. 4(a) shows a transmitted signal S(t), FIG. 4(b) shows a BPSK transmitted signal, FIG. 4(c) shows the signal after being multiplied by a carrier wave, and FIG. 4(d) shows a decoded signal $a_n$.

DESCRIPTION OF EMBODIMENTS

Figure 1:
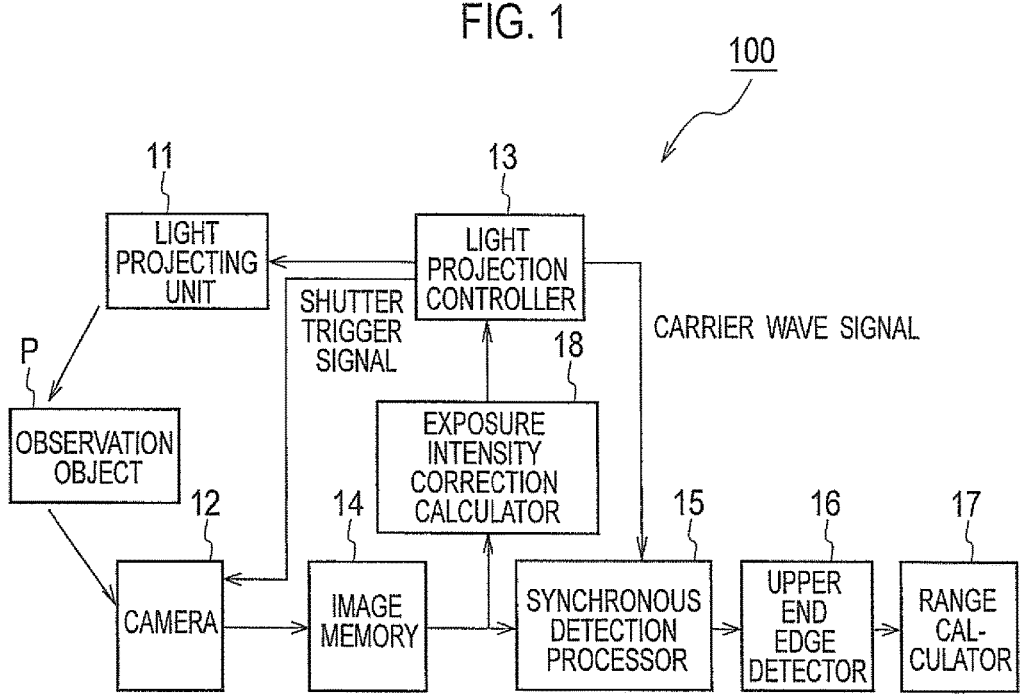
FIG. 1 is a block diagram showing a configuration of a range finding device 100 of an embodiment of the present invention.

An embodiment of the present invention will be described below on the basis of the drawings. Referring to FIG. 1, descriptions will be provided for a configuration of a range finding device 100 of an embodiment of the present invention. The range finding device 100 is mounted on a vehicle (an example of a moving body), and includes: a light projecting unit 11 configured to irradiate with irradiation light an observation object P (an object) which is an object of range finding around the vehicle; a camera (an example of an image capturing unit) 12 configured to capture an image of the observation object P irradiated with the irradiation light; and an image memory 14 capable of retaining a predetermined number of images outputted from the camera 12.

The range finding device 100 further includes: a light projection controller 13 configured to control the irradiation of the irradiation light by the light projecting unit 11; an exposure intensity correction calculator 18 configured to correct an amplitude and a direct-current component of the irradiation light projected from the light projecting unit 11; a synchronous detection processor 15 configured to perform a synchronous detection process on an image signal captured by the camera 12; an upper edge detector 16 configured to detect an upper edge (an example of an edge) of the observation object P from a synchronously detected image; and a range calculator 17 configured to compute a distance from the vehicle to the observation object P on the basis of the upper edge detected by the upper edge detector 16.

It should be noted that the image memory 14, the synchronous detection processor 15 and the exposure intensity correction calculator 18 constitute a "synchronous detector" in the embodiment. Furthermore, although the following descriptions will be provided citing the example in which the moving body is the vehicle, the present invention is not limited to this case, and is applicable to other moving objects such as railroad trains and ships. In addition, the range finding device 100 of the embodiment may be formed using an integrated computer including, for example, a central processing unit (CPU), and storage units such as a RAM, a ROM and a hard disk.

The light projecting unit 11 is, for example, a headlamp including a projector headlamp and a reflector. The light projecting unit 11 projects the irradiation light, which has light distribution characteristics of forming a horizontal irradiation domain, to the observation object P. Accordingly, when the observation object P is irradiated with intensity-modulated irradiation light, a brightness boundary between the irradiation domain and a non-irradiation domain, namely the upper edge, can be clearly shown on the observation object P. Moreover, a visible, infrared or ultraviolet light emitting source may be used as a light emitting source of the light projecting unit 11.

The camera 12 includes an image capturing device such as a CCD or a CMOS, and captures an image around the vehicle. To put it specifically, background light, and reflected light which results from the reflection of the irradiation light projected by the light projecting unit 11 off the observation object P enter the image capturing device included in the camera 12. The image capturing device included in the camera 12 outputs brightness corresponding to the intensity of the incident light in accordance with a brightness sensitivity characteristic, which will be described later. Furthermore, in a case where the light projecting unit 11 uses visible light, infrared light, ultraviolet light or the like, a device capable of observing a wavelength of the visible light, the infrared light or the ultraviolet light is used as the image capturing device to be included in the camera 12.

The image memory 14 has a function of retaining the predetermined number of images outputted from the camera 12. The image memory 14 retains the multiple images captured in time series by the camera 12.

The synchronous detection processor 15 synchronously detects a modulated signal included in the irradiation light outputted from the light projection controller 13, and thereby outputs an irradiation light extraction image in which only pixels (a synchronous detection region) whose brightness varies synchronously with the modulation of the intensity of the irradiation light are extracted. The synchronous detection process is performed on all the pixels in each of the multiple images (or all the pixels in an image processing region in a case where a processing region is limited in a particular image) stored in the image memory 14. Thereafter, the synchronous detection processor 15 outputs the irradiation light extraction image to the upper end edge detector 16. Incidentally, the detailed configuration of the synchronous detection processor 15 will be later described referring to a block diagram shown in FIG. 2.

The light projection controller 13 outputs: a trigger signal for indicating timings at which pulses of the irradiation light projected from the light projecting unit 11 are turned on and off for the purpose of modulating the irradiation light through PWM control; a trigger signal for indicating timings at which images are captured by the camera 12; and a control signal for indicating a shutter time (an exposure time). In addition, the light projection controller 13 outputs a carrier wave (a carrier frequency) signal used for the PWM control to the synchronous detection processor 15. Moreover, when data on the amplitude of the intensity-modulated irradiation light and an amount of direct current offset (an direct current component) is given by the exposure intensity correction calculator 18, the light projection controller 13 corrects the timings at which the pulses are turned on and off for the purpose of the PWM control on the basis of the data.

Figure 6:
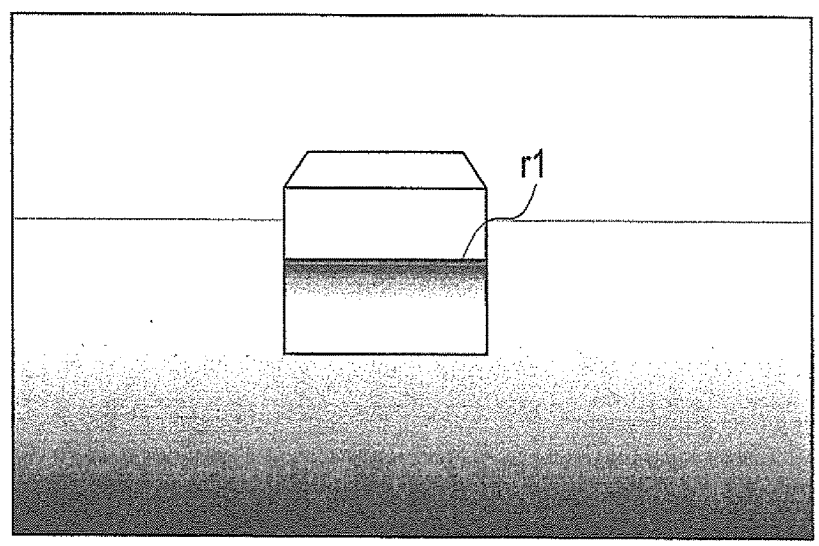
FIG. 6 is a perspective view showing an example of an image captured by a camera 12 shown in FIG. 1.

The upper end edge detector 16 detects the position of the upper end edge of the irradiation light from the irradiation light extraction image extracted by the synchronous detection processor 15, and outputs information on the vertical position of the upper end edge in the image (information on the position of the upper end edge r1 of the irradiation light in the vertical direction as shown in FIG. 6).

Figure 7:
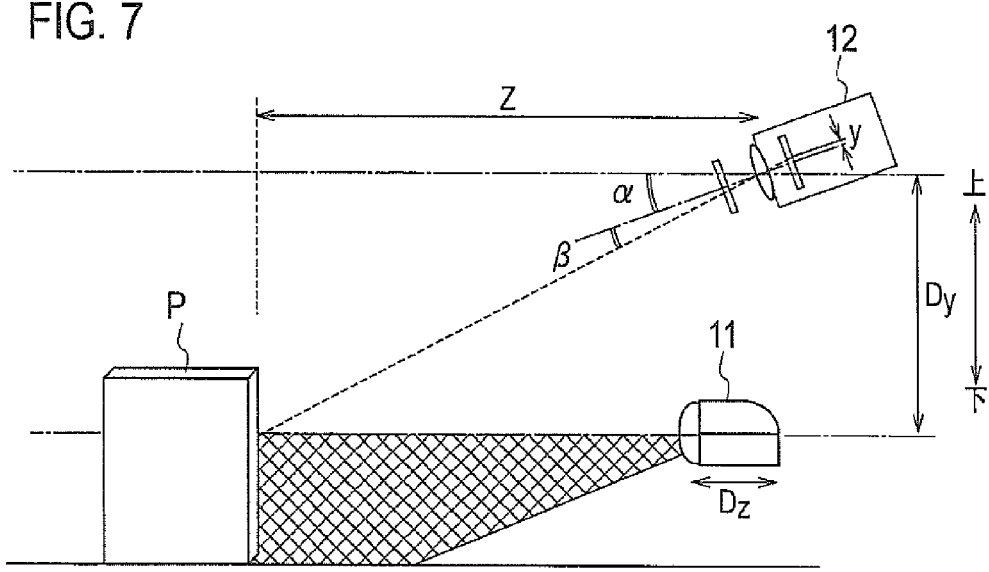
FIG. 7 is an explanatory diagram showing a principle on the basis of which the distance to the observation object P is measured.

Using the information on the vertical position of the upper end edge outputted from the upper end edge detector 16, the range calculator 17 calculates the distance to the observation object P irradiated with the irradiation light, in accordance with a principle of triangulation on the basis of the angle between the direction of the irradiation of the upper end edge and the optic axis of the camera 12; and their layout. Referring to FIG. 7, descriptions will be later provided for procedures of the calculation.

Depending on conditions of presence of brightness output values for a non-linear region from the image capturing device in the images stored in the image memory 14, the exposure intensity correction calculator 18 calculates the amplitude of the irradiation light and the amount of direct current offset which are needed to turn the brightness output values for the non-linear region into brightness output values for a linear region, and outputs a result of the calculation to the light projection controller 13.

Figure 2:
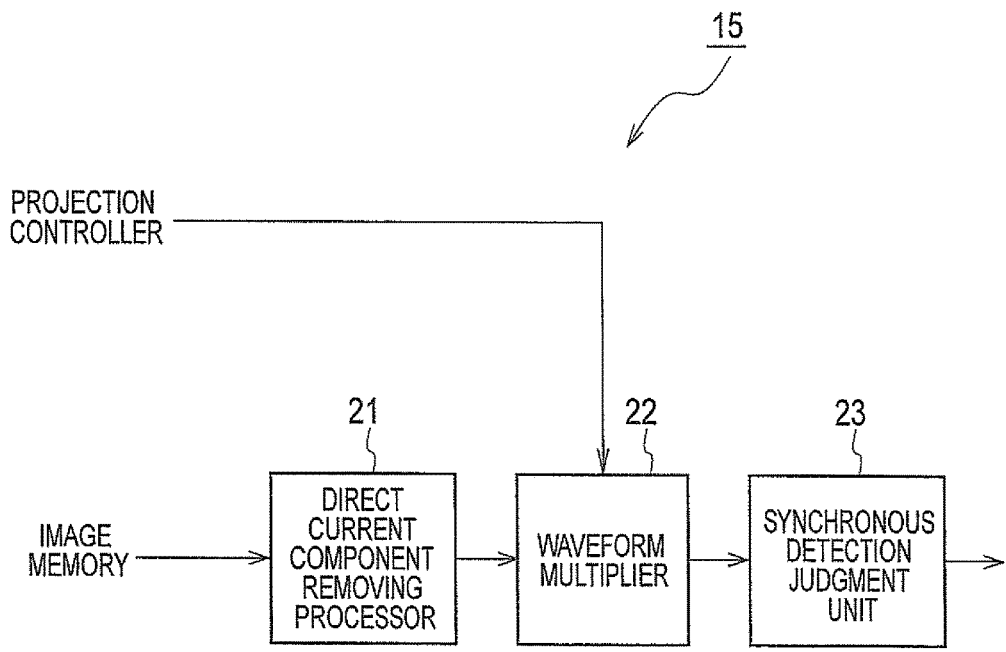
FIG. 2 is a block diagram showing a detailed configuration of a synchronous detection processor 15 shown in FIG. 1.

Referring to FIG. 2, descriptions will be provided for a detailed configuration of the synchronous detection processor 15. The synchronous detection processor 15 includes: a direct current component removing processor 21, a waveform multiplier 22 and a synchronous detection judgment unit 23.

The direct current component removing processor 21 reads images, from the images stored in the image memory 14, in the number corresponding to the modulation period for the light projection control. Thereafter, the direct current component removing process 21 performs an averaging process on brightness values for the respective pixels in the read images in time series, and thereby removes an average value from the brightness output values of the pixels.

The waveform multiplier 22 multiplies each pixel in the images from which the direct current component is removed by the direct current component removing processor 21, by the modulation signal (the carrier wave signal) sent from the light projection controller 13.

For each signal multiplied by the modulation signal by means of the waveform multiplier 22, the synchronous detecting judgment unit 23 judges whether the signal is positive or negative, and thereby judges whether the signal is synchronous with the modulation signal used for the light projection control.

Figure 3:
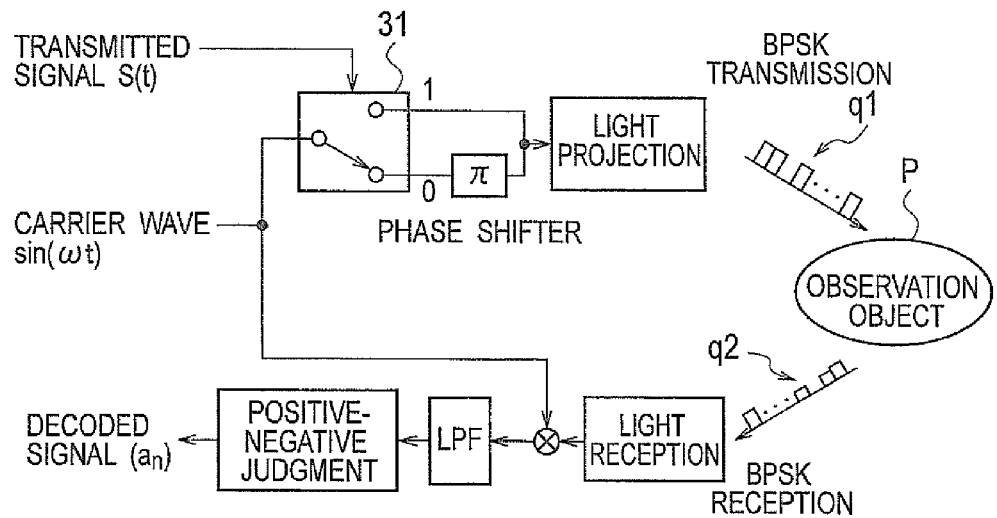
FIG. 3 is a block diagram showing procedures for a process operation by the synchronous detection processor 15 shown in FIG. 1.
Figure 4:
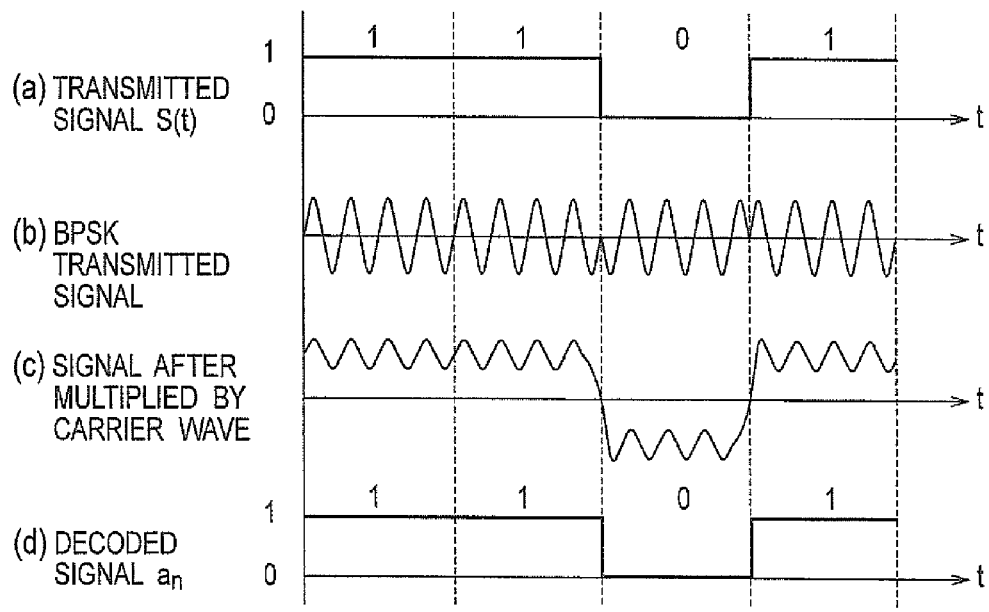

Next, referring to a schematic diagram shown in FIG. 3 and a timing chart shown in FIG. 4, descriptions will be provided for the basic principle of general synchronous detection conducted by the synchronous detection processor 15. When irradiating the observation object P with the irradiation light from the light projecting unit 11 and thereby detecting the reflected light reflected off the observation object P, the range finding device 100 of the embodiment detects the projected irradiation light by discriminating it from other light (background light). To this end, the range finding device 100 uses the synchronous detection process as a process of robustly detecting the projected irradiation light alone.

In the embodiment, the range finding device 100 performs the synchronous detection process on all the pixels in the images captured by the camera 12, or all the pixels in an image region set as a process region, and thereby extracts the irradiation light from each pixel. Detailed descriptions will be provided below with reference to FIGS. 3 and 4.

A transmitted signal S(t) (t denotes a period of time) shown in FIG. 3 is a binary signal which varies between "1" and "0" at intervals of a predetermined period of time as shown in FIG. 4(a). When the transmitted signal S(t) is sent, a BPSK (Binary Phase Shift Keying) transmitted signal is generated by modulating the phase of a carrier wave sin (wt) having a frequency w sufficiently higher than the transmitted signal S(t) is modulated by the transmitted signal S(t). To put it specifically, if S(t)=1, the carrier wave sin (wt) is directly outputted by switching a switching unit 31 to an upper side. If S(t)=0, the carrier wave sin (wt) is outputted with its waveform shifted in phase by π (180 degrees) by switching the switching unit 31 to a lower side.

As a result, the signal (the BPSK transmitted signal) having the phase-modulated waveform as shown in FIG. 4(b) (having the waveform which is shifted in phase by 180 degrees if S(t)=0) is generated, and the BPSK transmitted signal is projected from the light projecting unit 11 to the observation object P which is an ambient object (see what is denoted by reference sign q1 in FIG. 3). In short, the modulated signal sent from the light projecting unit 11 is expressed with "2×(S(t)−0.5)×sin(ωt)."

On the other hand, the irradiation light projected onto the observation object P is reflected off the observation object P (see what is denoted by reference sign q2 in FIG. 3), and is detected by the camera 12. The DC component (the direct current component) is removed from the modulated signal included in the image. Furthermore, the multiplier multiplies the resultant modulated signal by the carrier wave sin (wt). The modulated signal multiplied by the carrier wave sin (ωt) is expressed with Equation (1) given below.

$$A \times (S(t)-0.5) \times \sin(\omega t) \times \sin(\omega t) = A \times (S(t)-0.5) \times (1-\cos(2\omega t))/2 \quad (1)$$

where A denotes a constant including influence of the reflection.

As shown by Equation (1), an output signal from the multiplier is a signal containing mixed signal components of a sum of the frequencies (which is the DC component) and a difference between the frequencies (which is a double harmonic component). In other words, as shown in FIG. 4(c), there is obtained a waveform with a doubled frequency, which is amplified in the positive direction if S(t)=1 and in the negative direction if S(t)=0.

Thereafter, the output signal is smoothed by removing the harmonic component by use of a LPF (low-pass filter), and it is further judged whether the resultant signal is positive or negative. Thus, as shown in FIG. 4(d), the transmitted binary signal S(t) can be extracted as a decoded signal $a_n$. It should be noted that although the foregoing descriptions have been provided for the case where the BPSK transmitted signal is used as the detection signal, a signal generated by another method including any one or a combination of amplitude modulation, phase modulation and frequency modulation may also be applicable.

Thereafter, on the basis of the principle described referring to FIGS. 3 and 4, the synchronous detection processor 15 shown in FIG. 1 acquires an irradiation light extraction image by performing the synchronous detection process on each of the images stored in the image memory 14. Furthermore, if a change in brightness of one of the images captured by the camera 12 and stored in the image memory 14 brings about a brightness output value for the non-linear region of the image capturing device installed in the camera 12, the exposure intensity correction calculator 18 shown in FIG. 1 calculates an amplitude and a direct current component for outgoing irradiation light which are needed to shift a prospective brightness output value from the non-linear region to the linear region. Subsequently, on the basis of the calculated amplitude and direct current component for the outgoing irradiation light, the light projection controller 13 controls an amplitude and a direct current component used for emission of the irradiation light.

Figure 5:
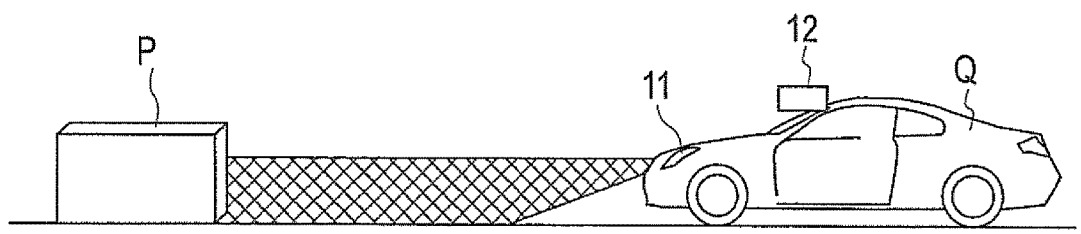
FIG. 5 is an explanatory diagram showing how the range finding device shown in FIG. 1 mounted on a vehicle Q measures a distance to an observation object P.

Next, descriptions will be provided for a light projection pattern in which the irradiation light is projected by the light projecting unit 11. As described above, the light projecting unit 11 mounted on the vehicle projects the irradiation light which has a horizontal pattern showing a clear contrast between brightness and darkness in the upper end portion of the irradiation domain. This light distribution pattern will be described below referring to FIGS. 5 and 6. FIG. 5 shows how the light projecting unit 11 mounted on the vehicle Q irradiates the observation object P with regional light (the irradiation light), and FIG. 6 shows an example of an image which is captured by the camera 12 when the observation object P is irradiated with the regional light (the irradiation light).

A relative positional relationship between the vehicle Q and the observation object P is likely to change as the orientation of the vehicle Q changes, and/or as the observation object P moves. Even in such a case, in order for the irradiation light to be stably extracted, the irradiation light needs to be continuously observed in the same position on the observation object P in the time-series image frames needed for the detection.

In reality, no restriction can be imposed on the movement of the vehicle Q or the observation object P. For this reason, a sufficiently wide domain for the irradiation light needs to be set in order to stably extract the irradiation light even when the vehicle Q and the observation object P move arbitrarily. To this end, the embodiment uses the irradiation light having the irradiation domain which spreads in the horizontal direction (which is long in the horizontal direction) as shown in FIG. 6.

Next, referring to a schematic diagram shown in FIG. 7, descriptions will be provided for a principle on which the measurement of the distance to the observation object P by use of the upper end edge of the irradiation light is based. As shown in FIG. 7, the camera 12 is placed in a position offset in a perpendicular direction (in a vertical direction) to a direction (a lateral direction) in which the irradiation light projected from the light projecting unit 11 spreads. The observation object P is irradiated with the irradiation light projected from the light projecting unit 11, and the camera 12 captures the irradiation light which is reflected off the surface of the observation object P. In this respect, let us assume a case where an angle of direction from the light projecting unit 11 to the upper end edge (0 degrees in the example shown in FIG. 7), a distance (a difference in elevation) Dy between the light projecting unit 11 and the camera 12, and an angle of depression a from the optic axis of the camera 12 are set in advance. In this case, a vertical orientation β where the upper end edge of the irradiation light is observed changes depending on a distance Z to the observation object P. For this reason, the distance Z to the observation object P can be calculated using a vertical position y of the upper end edge observed by the camera 12 on the basis of the principle of triangulation.

Figure 8:
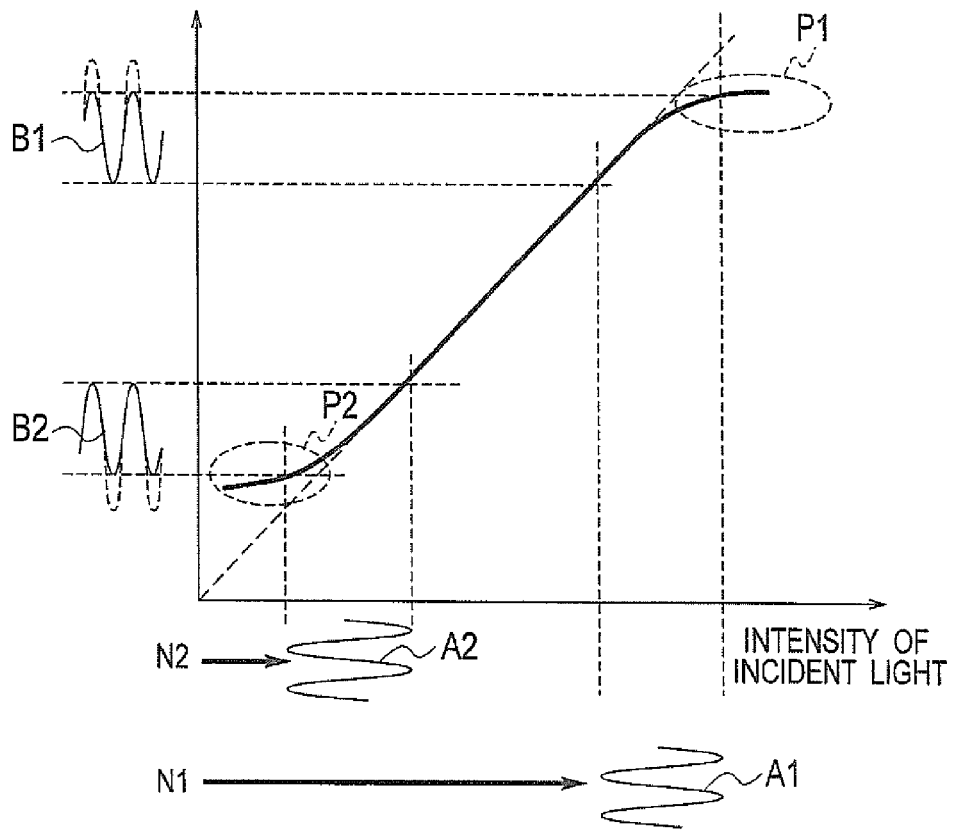
FIG. 8 is a graph showing an example of a relationship between intensity of input light and a brightness output value (a brightness sensitivity characteristic) which an image capturing device included in the camera 12 shown in FIG. 1 has.
Figure 9:
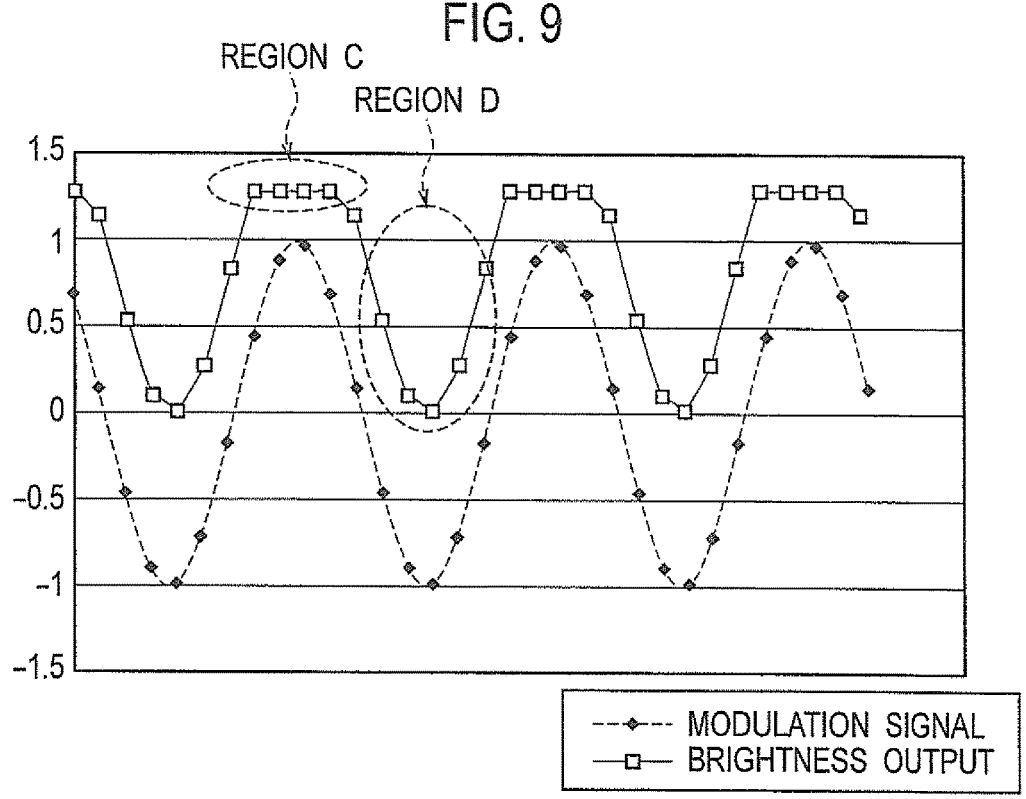
FIG. 9 is a graph showing how deformation occurs in an upper end portion of a brightness output signal from the image capturing device with respect to an intensity-modulated signal.
Figure 10:
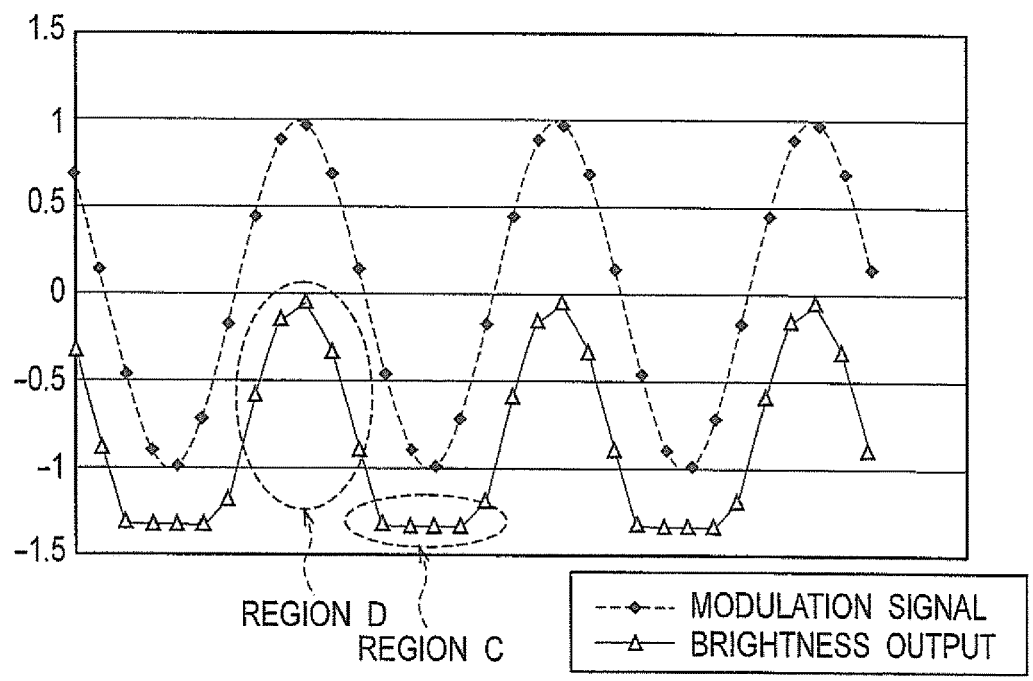
FIG. 10 is a graph showing how deformation occurs in a lower end portion of the brightness output signal from the image capturing device with respect to the intensity-modulated signal.

Next, referring to FIGS. 8 to 10, descriptions will be provided for why an error of detection failure occurs in the range finding using the intensity-modulated irradiation light.

FIG. 8 is a graph showing a brightness sensitivity characteristic of the image capturing device, which shows a relationship between the intensity of light incident on the image capturing device in the camera 12 and a brightness output value. In addition to the irradiation light projected from the light projecting unit 11, background light such as the sunlight is cast onto the observation object P. For this reason, the intensity of the incident light in the image captured by the camera 12 changes depending on the intensity of the direct current component of the background light.

In the case of background light having a larger direct current component (in the case of background light N1), the superposing of reflected light (A1) of the intensity-modulated irradiation light on the background light makes the intensity of the incident light (brightness of the image captured by the camera 12) becomes larger. For this reason, the image capturing device installed in the camera 12 detects the incident light in a non-linear region P1, and the brightness output value detected by the camera 12 takes a signal waveform in which an upper end portion is deformed like in a waveform (B1).

On the other hand, in the case of background light having a smaller direct current component (in the case of background light N2), the superposing of reflected light (A2) of the intensity-modulated irradiation light on the background light makes the intensity of the incident light become smaller. For this reason, the image capturing device installed in the camera 12 detects the incident light in a non-linear region P2, and the brightness output value detected by the camera 12 takes a signal waveform in which a lower end portion is deformed like in a waveform (B2).

FIG. 9 is a graph showing time-series changes in brightness of pixels in which a signal waveform having a deformed upper end portion is observed. A region C shown in FIG. 9 represents a group of sample points where saturation is detected due to the non-linear characteristic of the camera 12. As long as the received waveform is deformed, a direct current offset component(=A/2; see Equation (1)) cannot be obtained accurately. For this reason, if the synchronous detection process is performed, an error occurs in reshaping the binary signal S(t) on the basis of the judgment of whether the signal is positive or negative after the calculation using Equation (1) as described above. In other words, the existence of the non-linear regions P1, P2 shown in FIG. 8 deforms the brightness output value (causes the region C shown in FIG. 9 to come into existence) depending on the intensity of the incident light captured by the camera 12, and accordingly makes it impossible for the synchronous detection process to be performed accurately.

Furthermore, FIG. 10 is a graph showing time-series changes in brightness of pixels in which a signal waveform having a deformed lower end portion is observed. A region C shown in FIG. 10 represents a group of sample points where saturation is detected due to the non-linear characteristic of the camera 12. In addition, as in the case shown in FIG. 9 described above, the region C makes it impossible for the synchronous detection process to be performed accurately.

This embodiment uses the below-described method to avoid signal deformation in the non-linear regions P1, P2 of the image capturing device included in the camera 12, and to perform a highly accurate synchronous detection process, thereby enhancing accuracy of the range finding.

Descriptions will be herein below provided for a method of avoiding signal deformation in a non-linear region. In this embodiment, if an output value in a non-linear region is observed in a group of sample points included in an intensity-modulated signal detected by the camera 12, the amplitude and the direct current component of the irradiation light to be outputted from the light projecting unit 11 are controlled. By this, a brightness output value in the non-linear region is shifted to the linear region. When the synchronous detection is performed by use of the intensity-modulated irradiation light, a synchronization judgment can be accurately made without causing a detection failure. Detailed descriptions will be provided below.

Figure 11:
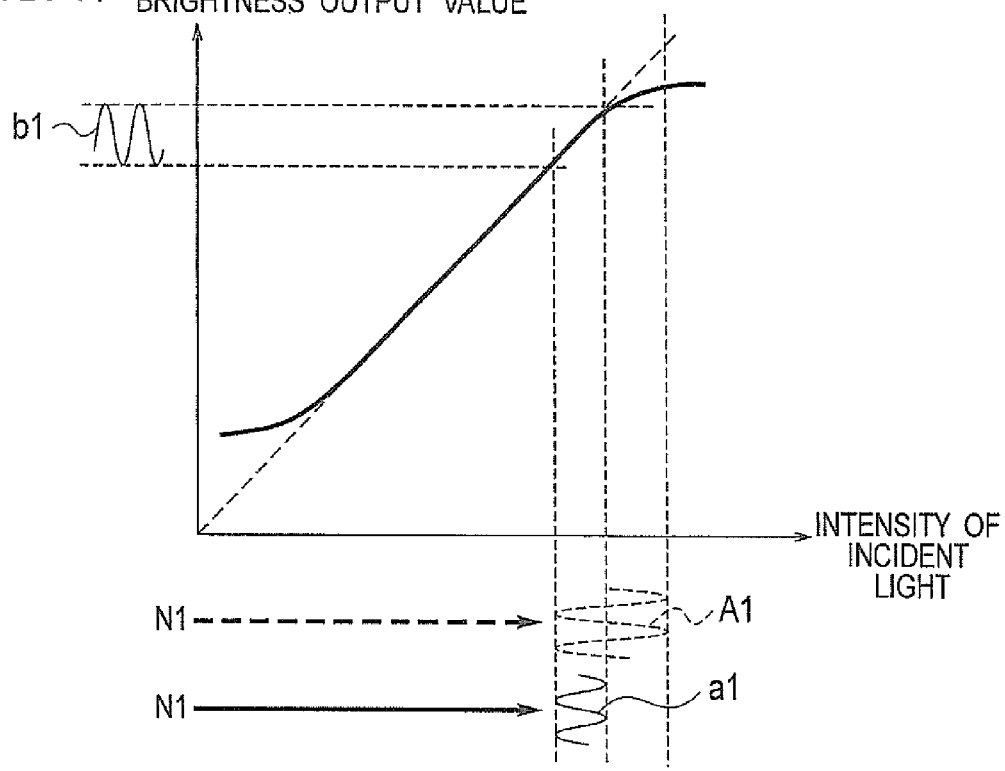
FIG. 11 is an explanatory diagram of a process of correcting an amplitude of modulated light in a non-linear region in a bright portion of the image capturing device.

If, as shown in the region C in FIG. 9, a brightness output value is observed in a non-linear region in a bright portion (a region with a high incident light intensity) of the camera 12, the amplitude of the irradiation light to be outputted from the light projecting unit 11 is reduced. Thereby, the observation of the brightness output value in the non-linear region is avoided. To put it concretely, as shown in FIG. 11, a waveform with an amplitude A1 of pre-correction irradiation light is changed to a waveform a1 with a reduced amplitude. In other words, the waveform of the irradiation light to be superposed on background light N1 is changed to the waveform a1 to be detected in the linear region of the image capturing device. Thereby, the detection in the non-linear region can be avoided. For this reason, the brightness output value from the image capturing device in the camera 12 takes on a waveform which does not have deformation with respect to the input light intensity, as shown as a waveform b1 in FIG. 11. This makes it possible to avoid the occurrence of the deformed region shown in the region C in FIG. 9, and accordingly to perform the synchronous detection process with high accuracy.

Figure 12:
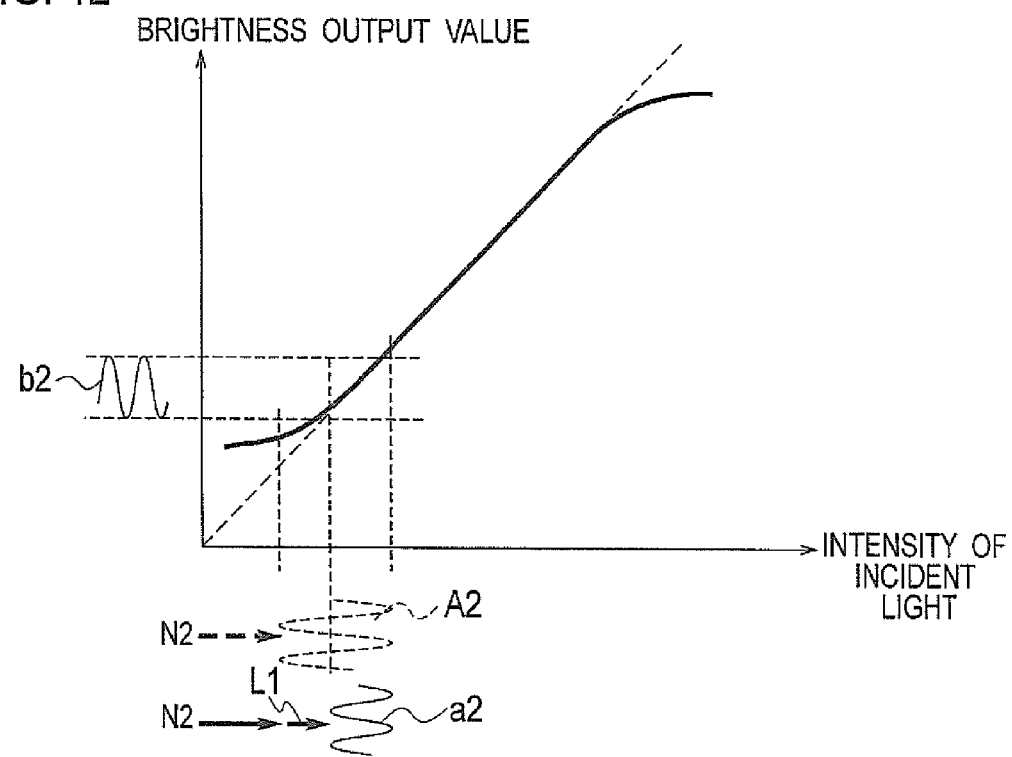
FIG. 12 is an explanatory diagram showing a process of correcting the amplitude of the modulated light and superposing a direct current component in a non-linear region in a dark portion of the image capturing device.

On the other hand, if, as shown in the region C in FIG. 10, a brightness output value is observed in a non-linear region in a dark portion (a region with a low incident light intensity) of the camera 12, the amplitude of the irradiation light to be outputted from the light projecting unit 11 is reduced, and the direct current component is superposed on the amplitude. Thereby, the observation of the brightness output value in the non-linear region is avoided. To put it concretely, as shown in FIG. 12, a waveform with an amplitude A2 of pre-correction irradiation light is changed to a waveform a2 with the reduced amplitude and with the direct current component L1 superposed thereon. In other words, the waveform of the irradiation light to be superposed on background light N2 is changed to the waveform a2 to be detected in the linear region of the image capturing device. Thereby, the detection in the non-linear region can be avoided. For this reason, the brightness output value from the image capturing device in the camera 12 takes on a waveform which does not have deformation with respect to the input light intensity, as shown as a waveform b2 in FIG. 12. This makes it possible to avoid the occurrence of the deformed region shown in the region C in FIG. 10, and accordingly to perform the synchronous detection process with high accuracy.

In sum, if a brightness output of an image captured by the camera 12 is a brightness output in a non-linear region of the image capturing device in the camera 12, the exposure intensity correction calculator 18 calculates the amplitude and direct current component of the irradiation light which are needed to shift the brightness output from the non-linear region to the linear region. Subsequently, the light projection controller 13 controls the output of the irradiation light such that the irradiation light can have the calculated amplitude and direct current component. This makes it possible to obtain a brightness output which does not have deformation with respect to the input light intensity, and accordingly to enhance the accuracy of the synchronous detection.

Figure 13:
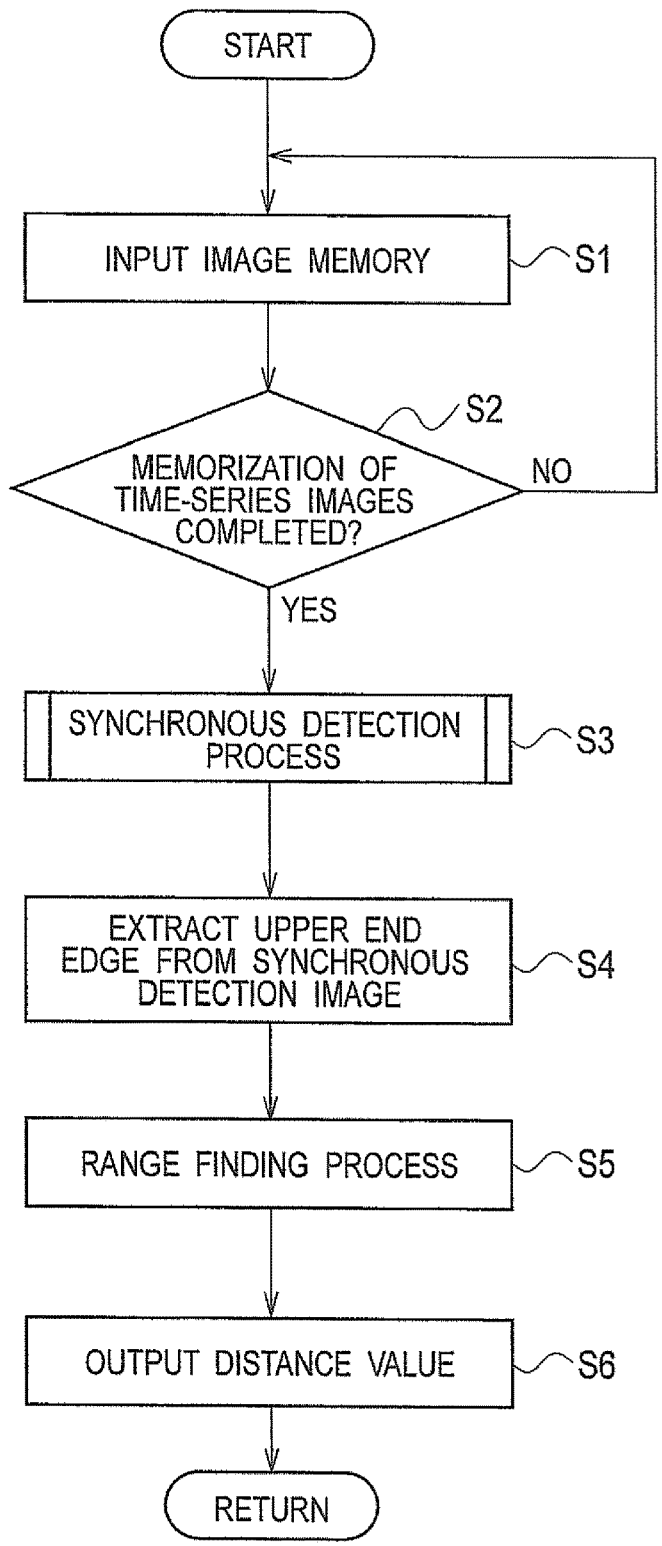
FIG. 13 is a flowchart showing an example of procedures of a range finding method using the range finding device shown in FIG. 1.
Figure 14:
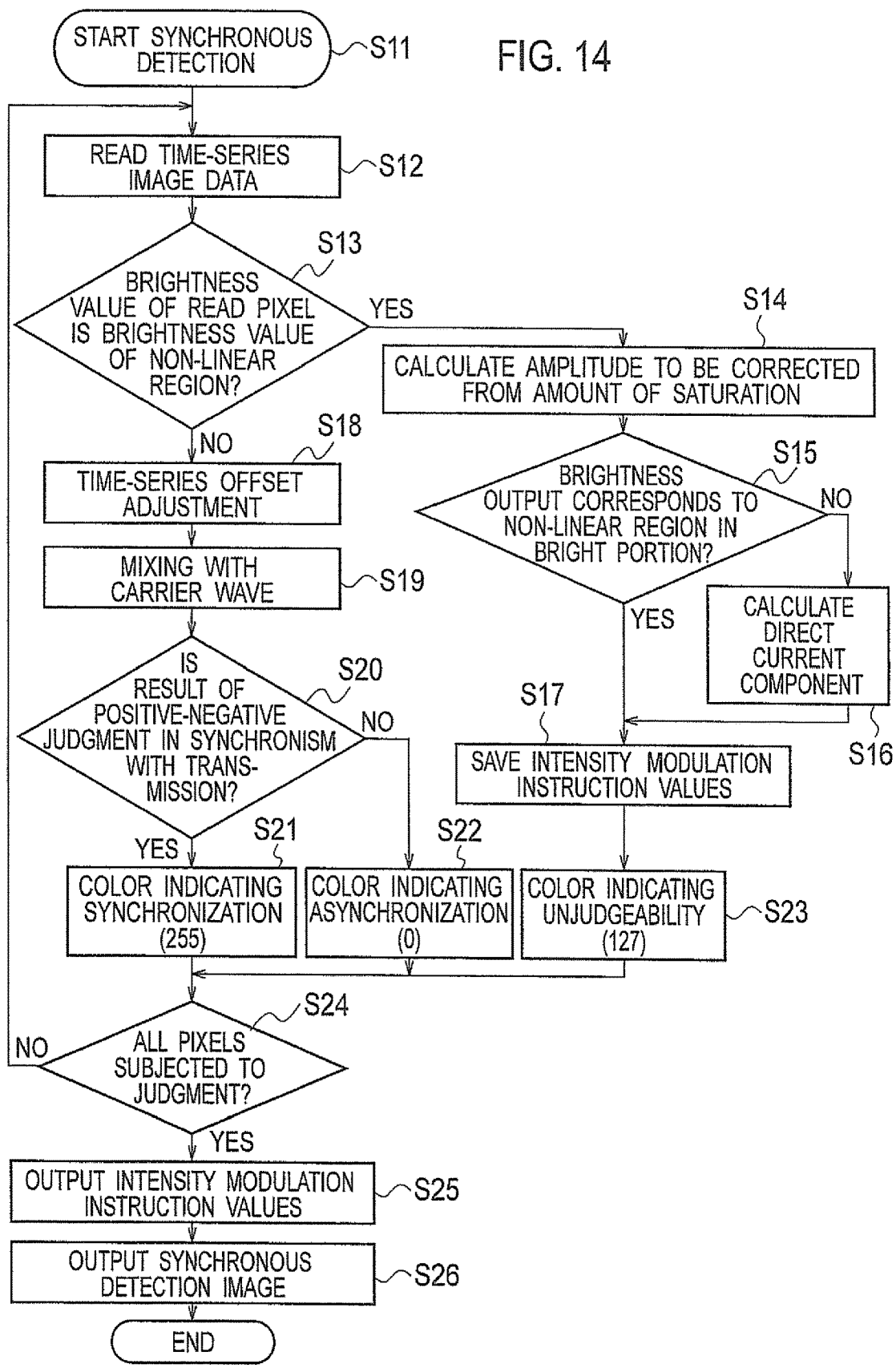
FIG. 14 is a flowchart showing detailed procedures of a synchronous detection process shown in FIG. 13.

Next, referring to flowcharts shown in FIGS. 13 and 14, descriptions will be provided for procedures of processing operations by the range finding device 100 of the embodiment.

First of all, in step S1, images captured by the camera 12 are saved into the image memory 14 (see FIG. 1). In step S2, it is judged whether or not as many frames of images as needed for the synchronous detection are saved in the image memory 14. If as many frames of images as needed for the synchronous detection are not saved there, the process returns to step S1. If as many frames of images as needed for the synchronous detection are saved there, the process proceeds to step S3.

In step S3, the below-described synchronous detection process is performed. Thereafter, the process proceeds to step S4. In step S4, an upper end edge of a synchronous detection region is extracted. Then, the process proceeds to step S5.

In step S5, on the basis of data on the upper end edge detected in the process in step S4, a range finding process is performed using triangulation. To put it specifically, the distance Z to the observation object P is measured on the basis of the method which has been explained by referring to FIG. 7. Thereafter, the process proceeds to step S6.

In step S6, the distance Z obtained in step S5 is outputted to a lower-order system. Thereafter, the process is terminated. In this manner, the distance Z from the installation position of the camera 12 to the observation object P can be measured.

Next, referring to a flowchart shown in FIG. 14, descriptions will be provided for procedures of the synchronous detection process shown in step S3.

First of all, in step S11, the synchronous detection process is started. In step S12, time-series data on as many images as needed for the synchronous detection are acquired from the images stored in the image memory 14. Thereafter, the process proceeds to step S13.

In step S13, for each pixel, it is judged whether or not a brightness output value in either of the non-linear regions of the image capturing device is present in the time-series data. If it is judged that such a brightness output value is present there, the process proceeds to step S14. If it is judged that no such a brightness output value is present there, the process proceeds to step S18.

In step S14, an amount of correction of the amplitude is calculated from an amount of saturation of the brightness value. In this process, a value of correction of amplitude of the modulated signal is calculated in accordance with a proportion of the brightness output in the non-linear region to the modulation period. To put it concretely, the amount of saturation is found from a comparison between the input waveform A1 (or A2) and the output waveform B1 (or B2) shown in FIG. 8. On the basis of the amount of saturation, the input waveform a1 shown in FIG. 11 (or the input waveform a2 shown in FIG. 12) is obtained. Thereafter, the process proceeds to step S15.

In step S15, it is judged whether or not the non-linear region in question is the brightness output in the non-linear region in the bright portion. In other words, it is judged whether the non-linear region is the linear region P1 or the non-linear region P2 shown in FIG. 8. If the non-linear region is the non-linear region in the dark portion (if NO in step S15), the direct current component is calculated in step S16. In other words, the direct current component L1 shown in FIG. 12 is calculated. Thereafter, the process proceeds to step S17.

In step S17, the value of the correction of the amplitude and the direct current component (intensity modulation instruction values) are stored. Then, in step S23, it is judged that this output signal cannot be judged, and coloring for indicating that the output signal cannot be judged is applied (such as gray; 127 in 8-bit gradation). In other words, since the brightness output value detected in either of the non-linear regions P1, P2 shown in FIG. 8 is less reliable, the brightness output value is displayed in the color (gray) indicating that the judgment is impossible. Furthermore, the intensity modulation instruction values are saved in step S17, and the intensity of the irradiation light projected subsequently from the light projecting unit 11 is adjusted on the basis of the intensity modulation instruction values. In other words, the intensity of the subsequent irradiation light is controlled such that the waveform forms the waveform a1 shown in FIG. 11 or the waveform a2 shown in FIG. 12. For this reason, the brightness output value will not be obtained from either of the non-linear regions (that is to say, NO in the process in step S13). Accordingly, the synchronous detection process is performed with high accuracy. Thereafter, the process proceeds to step S24.

In step S18, the averaging process is performed on each pixel, and the average value of the pixels is divided from each time-series data. Thereby, the DC offset component is removed. Subsequently, the process proceeds to step S19. In step S19, the offset-adjusted time-series data and the carrier wave are multiplied together. Thereafter, the process proceeds to step S20.

In step S20, it is judged whether or not the transmitted signal S(t) is synchronous with a result of judgment on whether the product of the multiplication is positive or negative. If the transmitted signal S(t) and the result of the judgment are synchronous with each other, the process proceeds to step S21, where a color for indicating the synchronization (such as white; "255" in the 8-bit gradation) is overwritten on the pixels. On the other hand, if the transmitted signal S(t) and the result of the judgment are not synchronous with each other, the process proceeds to step S22, where a color for indicating asynchronization (such as black; "0" in the 8-bit gradation) is overwritten on the pixels. Thereafter, the process proceeds to step S24.

In step S24, it is judged whether or not all the pixels have been subjected to the judgment. If not all the pixels have been subjected to the judgment yet, the process returns to step S12, where the synchronous detection judgment is performed on a pixel which has not been subjected to the judgment yet. On the other hand, if all the pixels have been subjected to the judgment, the process proceeds to step S25, where the intensity modulation instruction values are outputted. In other words, for the next measurement, the intensity modulation instruction values (the instruction values for specifying the amplitude and the direct current component) are outputted to the light projection controller 13. Subsequently, in step S26, the synchronous detection image is outputted. Hence, the process is completed.

As described above, if the range finding device 100 of the embodiment detects a brightness output value in either of the non-linear regions of the image capturing device, the range finding device 100 is capable of reliably making the positive-or-negative judgment by adjusting the amplitude and the direct current component of the irradiation light in order for the brightness output value to be detected in the linear region of the image capturing device.

Next, descriptions will be provided for how the resolution is enhanced by setting the direction of the camera 12 in a way that the optic axis of the camera 12 is at a predetermined angle of depression relative to the direction of exposure of the upper end edge.

When a wide area is observed with the single camera 12, a wide-angle lens is usually used. A general wide-angle lens uses an equidistant projection lens (a so-called fθ lens) as a projection method. For this reason, the resolution in the peripheral visual field is not as good as the resolution in the central visual field. When combined with such a wide-angle lens, it is desirable to direct a high-resolution field properly to an area to be monitored by providing the optic axis of the camera with an angle of depression (or an angle of elevation).

Figure 15:
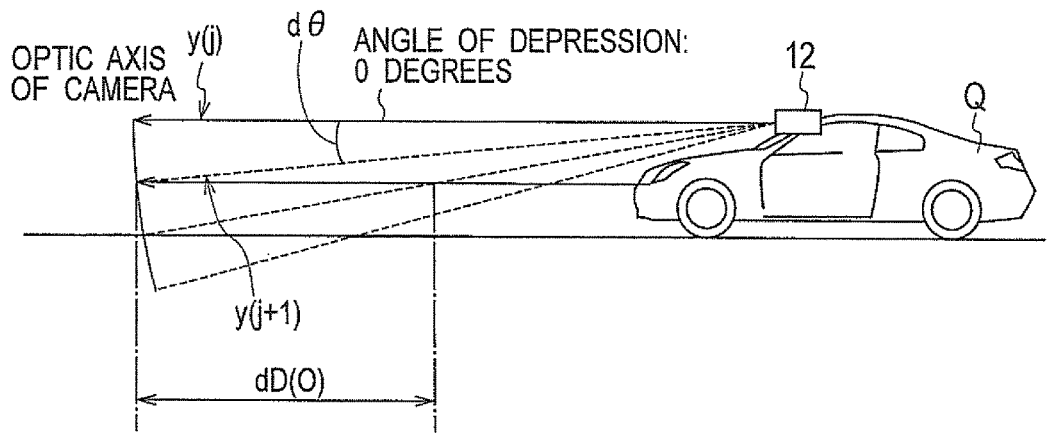
FIG. 15 is an explanatory diagram showing a distance resolution in a case where the optic axis of the camera 12 shown in FIG. 1 is at no angle of depression.

For the sake of simplicity, let us assume a case where, when combined with the fθ lens, the upper end edge of the irradiation light is horizontal to a road surface. On the basis of the assumption, descriptions will be provided for how the resolution for the measured value of the distance to the observation object is enhanced by the optic axis of the camera 12 at the angle of depression by referring to FIGS. 15 and 16. FIG. 15 shows a case where the optic axis of the camera 12 is not at the angle of the depression, and FIG. 16 shows a case where the optic axis of the camera 12 is at the angle of depression.

Figure 16:
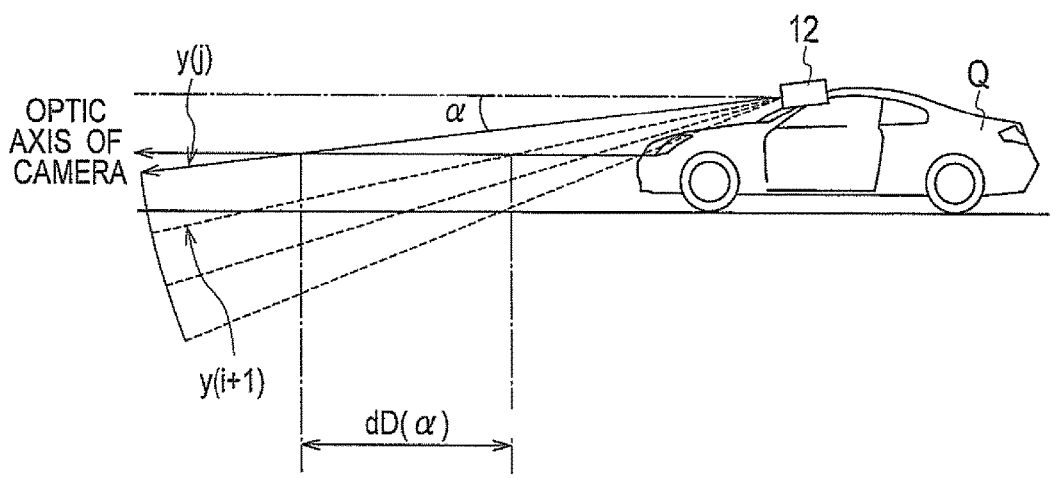
FIG. 16 is an explanatory diagram showing a distance resolution in a case where the optic axis of the camera 12 shown in FIG. 1 is at an angle of depression.

In FIGS. 15 and 16, a pixel position of the optic axis of the camera is denoted by y(j), and a pixel position thereof adjacent to and below the pixel position y(j) is denoted by y(j+1). In this case, as shown in FIG. 15, if the optic axis of the camera is not at an angle of depression (if the optic axis of the camera is at a 0-degree angle of depression), an angular resolution dθ of one pixel determined by the pixel positions y(j), y(j+1) corresponds to a distance resolution dD(0) in terms of the actual spatial distance. On the other hand, as shown in FIG. 16, if the optic axis of the camera is at an angle of depression (an angle of elevation) (in the case equal to α degrees), an angular resolution dθ of one pixel determined by the pixel positions y(j), y(j+1) corresponds to a distance resolution dD(α) in terms of the actual spatial distance. Since the distance resolution dD(α) is smaller than the distance resolution dD(0), the actual spatial resolution becomes higher with respect to the angular resolution of the one pixel when the optic axis of the camera is at the angle of depression (the angle of elevation). In other words, when the axis of the camera is at the angle α of depression, the actual spatial resolution for extracting the upper end edge can be made higher.

In this manner, the upper end edge of the irradiation light projected by the light projecting unit 11 is formed in an area which spreads in the lateral direction to the camera 12. The camera 12 is placed offset vertically from the exposure direction of the upper end edge. Furthermore, the optic axis of the camera 12 is at the predetermined angle of depression or at the predetermined angle of elevation relative to the exposure direction of the upper end edge. Thereby, even when the general wide-angle lens (a fisheye lens) is used, the measurement accuracy with which the distance is measured on the basis of the triangulation principle is enhanced.

As described above, in the range finding device 100 of the embodiment, the light projecting unit 11 projects the irradiation light, whose intensity is modulated by use of the predetermined modulation frequency, to the irradiation domain, and the time-series images captured by the camera 12 are stored in the image memory 14. Subsequently, the synchronous detection processor 15 performs the synchronous detection process on the acquired time-series images, and extracts information on the brightness of the pixels synchronous with the intensity modulation of the irradiation light. During the modulation period of the irradiation light, the amplitude and the direct current component of the irradiation light projected from the light projecting unit 11 are controlled if the upper end portion or the lower end portion of the image capturing signal becomes higher than the upper end portion, or lower than the lower end portion, of the linear region of the brightness sensitivity characteristic of the image capturing device in the camera 12. Thereby, the brightness is adjusted such that the brightness output value falls within the linear region in the brightness sensitivity characteristic of the image capturing device. For this reason, the synchronous detection process can be performed with high accuracy, and the range finding and the shape measurement can be performed stably.

Moreover, if a change in the brightness of any one of the images captured by the camera 12 brings about a brightness output value in the non-linear region in the bright portion of the image capturing device, the intensity amplitude of the irradiation light projected from the light projecting unit 11 is reduced. Thus, the control can be performed such that the change in the brightness of the image can lead to an output from the linear region. If the change in the brightness of the image brings about a brightness output value in the non-linear region in the dark portion of the image capturing device, the direct current offset for the irradiation light projected from the light projecting unit 11 is controlled, and the amplitude is reduced by the amount of offset control. Thus, the control can be performed such that the change in the brightness of the image can lead to an output from the linear region. Accordingly, it is possible to suppress an erroneous judgment in the synchronization judgment without exceeding an output performance of the light-emitting device in the light projecting unit 11, and the irradiation light extraction process can be performed stably.

In addition, the upper end edge of the irradiation light projected by the light projecting unit 11 is formed in the area which spreads in the lateral direction to the camera 12. The camera 12 is placed offset vertically from the exposure direction of the upper end edge. Furthermore, the optic axis of the camera 12 is at the predetermined angle of depression from, or at the predetermined angle of elevation to, the exposure direction of the upper end edge. For these reasons, even when the general wide-angle lens (the fisheye lens) is used, the measurement accuracy is enhanced at the time of the range finding based on the triangulation principle.

Moreover, if the light emitting source installed in the light projecting unit 11 is one which emits infrared light or ultraviolet light, the irradiation light can be more robustly detected by providing the camera 12 with a filter which allows light with a specific spectrum to pass through with high efficiency.

In addition, amplitude modulation, phase modulation and frequency modulation may be used for the synchronization signal to be used in the light projecting unit 11 and the synchronous detection processor 15. Furthermore, the robustness can be enhanced by using the BPSK transmitted signal which is a combination of the amplitude modulation and the phase modulation.

Next, descriptions will be provided for a modification of the embodiment. Let us assume a case where, as shown in FIG. 9, a brightness output value in the non-linear region in the bright portion of the image capturing device is observed. In this case, using a proportion N[%] of the brightness output value in the linear region in the modulation period of the irradiation light projected from the light projecting unit 11, control is performed to reduce the amplitude of the irradiation light intensity to N[%]. Thereby, it is possible to obtain an effect which is the same as that brought about in the above-described embodiment. For example, if the proportion N of the linear region is 60%, the reduction of the amplitude of the irradiation light intensity to 60[%] makes it possible to avoid the brightness output signal in the non-linear region.

On the other hand, if as shown in FIG. 10, a brightness output value in the non-linear region in the dark portion of the image capturing device is observed, control is performed to reduce the amplitude of the intensity of the irradiation light projected from the light projecting device 11 to N[%] and to superpose the direct current component by (100−N)[%] of the previous brightness amplitude value. Thereby, it is possible to avoid the brightness output signal in the non-linear region.

In this manner, the amplitude of the irradiation light projected from the light projecting unit 11 is reduced, and the direct current component is superposed on the amplitude, in accordance with the proportion of the period of time for which the brightness value in the linear region is outputted to the whole modulation period. Thus, it is possible to avoid the brightness output signal in the non-linear region by the very simple method.

The foregoing descriptions have been provided for the contents of the present invention on the basis of the embodiment. However, the present invention is not limited to the descriptions. It is obvious to those skilled in the art that various modifications and changes can be made.

The range finding device and the range finding method of the embodiment control the intensity of the irradiation light to shift a change in the brightness of an image to the linear region of the image capturing unit. Thereby, even if the brightness output value in a non-linear region of the image capturing unit is partially observed, it is possible to perform the range finding or the shape measurement stably without causing an error in the synchronous detection measurement of the irradiation light. Accordingly, the present invention is industrially applicable.

The invention claimed is:

1. A range finding device comprising:
a light projecting unit mounted on a moving body, having an irradiation domain extending in a horizontal direction, and configured to project intensity-modulated irradiation light;
an image capturing unit mounted on the moving body, and configured to capture an image of an object irradiated with the irradiation light;
a light projection controller configured to control the light projecting unit to control an intensity of the irradiation light in accordance with a timing at which the image capturing unit captures the image;
a synchronous detection unit configured to extract a region in which brightness changes in synchronism with intensity modulation of the irradiation light, as a synchronous detection region, from the image captured by the image capturing unit;
an edge detector configured to detect an edge of the synchronous detection region; and
a range calculator configured to calculate a distance to the object on the basis of the edge of the synchronous detection region detected by the edge detector, wherein
if the change in the brightness of the image captured by the image capturing unit brings about a brightness output value in a non-linear region of the image capturing unit, the synchronous detection unit calculates an amplitude and a direct current component of the irradiation light which are needed to shift the change in the brightness of the image to a linear region of the image capturing unit, and
the light projection controller controls the light projecting unit to control the intensity of the irradiation light on the basis of the calculated amplitude and direct current component of the irradiation light.

2. The range finding device according to claim 1, wherein
if the change in the brightness of the image brings about the brightness output value in the non-linear region in a bright portion of the image capturing unit, the light projection controller performs the control only to reduce the amplitude of the irradiation light, and
if the change in the brightness of the image brings about the brightness output value in the non-linear region in a dark portion of the image capturing unit, the light projection controller performs the control to reduce the amplitude of the irradiation light, and to superpose a direct current component by an amount of the reduction on the amplitude.

3. The range finding device according to claim 1, wherein
the light projection controller reduces the amplitude of the irradiation light in accordance with a proportion of a period of time for which the brightness in the linear region is outputted to a whole modulation period of the irradiation light.

4. The range finding device according to claim 1, wherein
the light projecting unit and the image capturing unit use any one or a combination of amplitude modulation, phase modulation and frequency modulation as the intensity modulation of the irradiation light.

5. The range finding device according to claim 1, wherein
the light projecting unit comprises a light source configured to project at least one of visible light, infrared light and ultraviolet light, and
the image capturing unit has sensitivity to any of a visible light region, an infrared region and an ultraviolet region depending on the light source included in the light projecting unit.

6. The range finding device according to claim 1, wherein
the image capturing unit is placed in a direction vertical to a direction in which the light projecting unit irradiates an upper end edge, and at a predetermined angle of depression.

7. A range finding device comprising:
a light projecting unit mounted on a moving body, having an irradiation domain extending in a horizontal direction, and configured to project intensity-modulated irradiation light;
an image capturing unit mounted on the moving body, and configured to capture an image of an object irradiated with the irradiation light;
a light projection controller configured to control the light projecting unit to control an intensity of the irradiation light in accordance with a timing at which the image capturing unit captures the image;
a synchronous detection unit configured to extract a region in which brightness changes in synchronism with the modulation of the intensity of the irradiation light, as a synchronous detection region, from the image captured by the image capturing unit; and
a range calculator configured to calculate a distance to the object on the basis of the synchronous detection region, wherein
in a case where an intensity of light incident on the image capturing unit changes beyond a linear region of the image capturing unit, the light projection controller reduces an amplitude of the irradiation light in such a manner that the intensity of the light incident on the image capturing unit changes in the linear region of the image capturing unit.

8. The range finding device according to claim 7, wherein
the case where the intensity of the light incident on the image capturing unit changes beyond the linear region of the image capturing unit is a case where the brightness of the image captured by the image capturing unit takes a brightness output value in a non-linear region of the image capturing unit.

9. A range finding method comprising:
irradiating an object with intensity-modulated irradiation light by use of a light projecting unit mounted on a moving body;
capturing an image of the object irradiated with the irradiation light by use of an image capturing unit mounted on the moving body;
controlling the light projecting unit to control an intensity of the irradiation light in accordance with a timing at which the image is captured;
extracting a region in which brightness changes in synchronism with intensity modulation of the irradiation light, as a synchronous detection region, from the captured image;
detecting an edge of the synchronous detection region;
calculating a distance to the object on the basis of the detected edge;
calculating an amplitude and a direct current component of the irradiation light which are needed to shift the change in the brightness of the image to a linear region of the image capturing unit if the change in the brightness of the captured image brings about a brightness output value in a non-linear region of the image capturing unit; and
controlling the light projecting unit to control the intensity of the irradiation light on the basis of the calculated amplitude and direct current component of the irradiation light.

10. A range finding device comprising:
a light projecting means mounted on a moving body, having an irradiation domain extending in a horizontal direction, and for projecting intensity-modulated irradiation light;
an image capturing means mounted on the moving body, and for capturing an image of an object irradiated with the irradiation light;
a light projection controlling means for controlling the light projecting means to control an intensity of the irradiation light in accordance with a timing at which the image capturing means captures the image;
a synchronous detection means for extracting a region in which brightness changes in synchronism with intensity modulation of the irradiation light, as a synchronous detection region, from the image captured by the image capturing means;
an edge detection means for detecting an edge of the synchronous detection region; and
a range calculator means for calculating a distance to the object on the basis of the edge of the synchronous detection region detected by the edge detection means, wherein
if the change in the brightness of the image captured by the image capturing means brings about a brightness output value in a non-linear region of the image capturing means, the synchronous detection means calculates an amplitude and a direct current component of the irradiation light which are needed to shift the change in the brightness of the image to a linear region of the image capturing means, and
the light projection controlling means controls the light projecting means to control the intensity of the irradiation light on the basis of the calculated amplitude and direct current component of the irradiation light.

11. A range finding device comprising:
a light projecting means mounted on a moving body, having an irradiation domain extending in a horizontal direction, and for projecting intensity-modulated irradiation light;
an image capturing means mounted on the moving body, and for capturing an image of an object irradiated with the irradiation light;
a light projection controlling means for controlling the light projecting means to control an intensity of the irradiation light in accordance with a timing at which the image capturing means captures the image;
a synchronous detection means for extracting a region in which brightness changes in synchronism with the modulation of the intensity of the irradiation light, as a synchronous detection region, from the image captured by the image capturing means; and
a range calculator means for calculating a distance to the object on the basis of the synchronous detection region, wherein
in a case where an intensity of light incident on the image capturing means changes beyond a linear region of the image capturing means, the light projection controlling means reduces an amplitude of the irradiation light in such a manner that the intensity of the light incident on the image capturing means changes in the linear region of the image capturing means.

\* \* \* \* \*